Aug. 10, 1948.　　　　H. E. HALL　　　　2,446,827
SCOOP AND TRIP MECHANISM THEREFOR
Filed Jan. 29, 1946　　　　　　　　　　3 Sheets-Sheet 1

Inventor
HOWARD E. HALL
Attorneys

Aug. 10, 1948. H. E. HALL 2,446,827
SCOOP AND TRIP MECHANISM THEREFOR
Filed Jan. 29, 1946 3 Sheets-Sheet 2
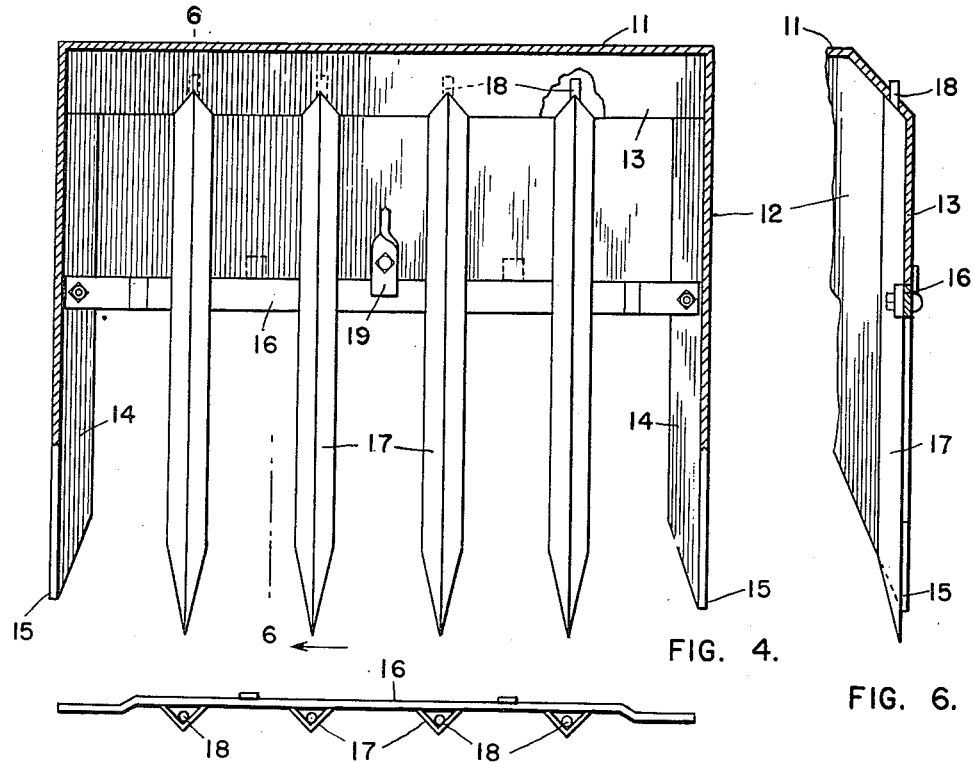
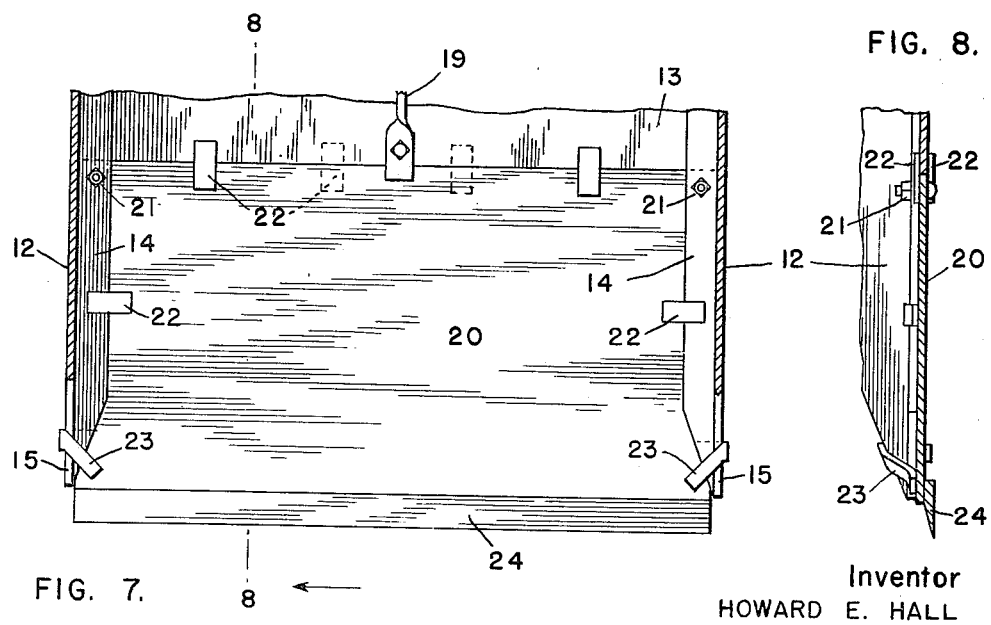
Inventor
HOWARD E. HALL
Attorneys Inventor
HOWARD E. HALL
Attorneys Patented Aug. 10, 1948

2,446,827

UNITED STATES PATENT OFFICE 2,446,827

SCOOP AND TRIP MECHANISM THEREFOR

Howard E. Hall, Boise, Idaho, assignor to Olson Manufacturing Company, Boise, Idaho, a corporation of Idaho Application January 29, 1946, Serial No. 644,070

7 Claims. (Cl. 214—146)

1

This invention has to do with mechanical loaders of that type which may be mounted on and operated from the usual farm tractor, and designed for lifting and loading materials of various kinds, such as earth, gravel, and other loose materials, or litter, barnyard fertilizer, and the like.

It relates particularly to a novel form of scoop, and to scoop dumping and resetting mechanism, which adapts it to the handling of these various materials by the interchange of parts designed for use with the different materials.

These results are accomplished by a scoop in the making of which readily detachable elements are provided which will give a scoop with a solid bottom for handling granular material, or a forked bottom for picking up and handling loose fibrous material and the like. In the drawings illustrated is shown one form of the invention.

In those drawings:

Figure 4 is a view in plan of the scoop frame with the fork member in place.

Figure 5 is a view in transverse cross section showing the tines and tine supporting bar.

Figure 6 is a fragmentary sectional view on substantially the line 6—6 of Figure 4.

Figure 7 is a plan view of a portion of the scoop frame with the solid removable scoop bottom in place.

Figure 8 is a view in section on substantially the line 8—8 of Figure 5.

Figure 3:
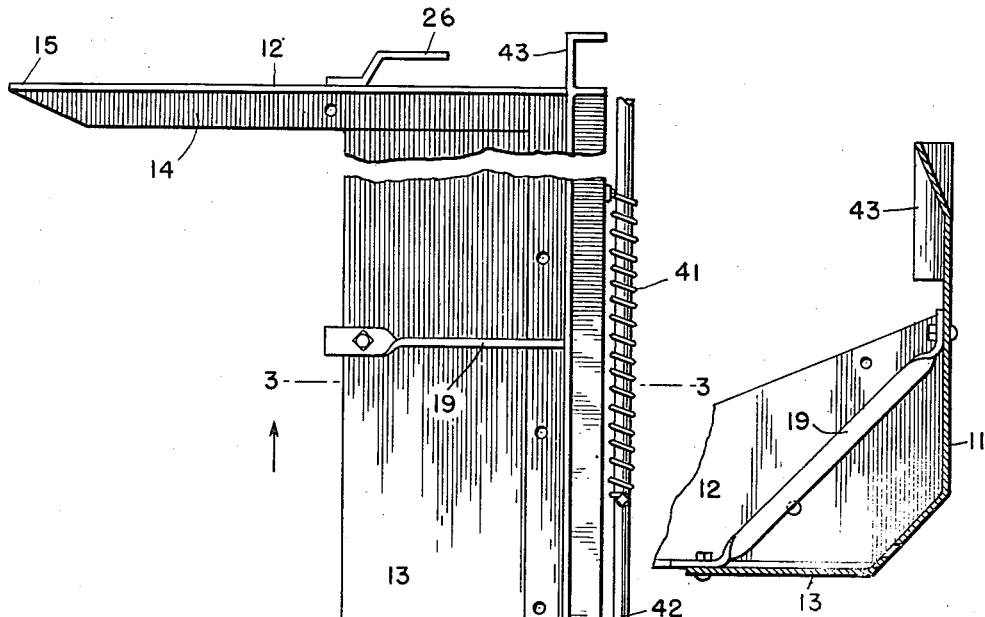
Figure 3 is a detail showing the back of the scoop, a portion of the sides and bottom, and the bracing strut between the two.
Figure 2:
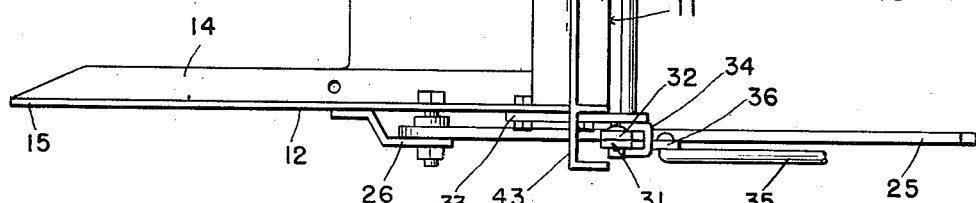
Figure 2 is a plan view of the scoop frame.

Referring to the drawings by numbers, the same numbers designating the same parts in the several views, the scoop frame is made up of a back portion 11, side portions 12, and a partial bottom portion 13. The side portions 12 of this scoop frame are flanged as at 14, and have their ends beveled or pointed, as shown at 15. This provides a skeleton frame having an open unobstructed front to permit either a scoop member or a fork member to be interchangeably mounted in the frame. Figs. 4 and 5 show the fork element mounted in place in the scoop frame. It is made up of the cross-bar 16 to which are secured

2 the forks 17, the cross-bar 16 being secured in any suitable manner, as by bolt and nut securing means, to the flanges 14 of the side portions 12. The ends of the bar 16 are slightly out of line with the body portion so as to properly position the fork members relative to the scoop frame.

The rear ends of the forks, as shown in Figs. 4, 5, and 6 have pins 18 which engage sockets or holes in the rear of the scoop frame. The cross-bar 16 engages the projecting end of a strut 19 secured at its upper end to the back wall 11 of the scoop, and at its lower end to the partial bottom 13 of the scoop, so as to assist in maintaining the fork in place.

The scoop thus constructed is useful in handling loose fibrous material, as it is readily insertable and engageable with such material, as distinguished from the convertible solid bottom scoop which will now be described.

To convert from the fork construction to a scoop having a solid bottom, it is necessary only to remove the fork and replace it with a solid plate 20, shown in Figs. 7 and 8. This plate is bolted at 21 beneath the flanges 14 of the scoop frame. This solid bottom 20 is provided with projections 22 at its rear and sides, the projections at the rear of the bottom 20 engaging above and below the partial bottom 13 of the scoop and the side lugs 22 engaging over the flanges 14 of the scoop frame so as to hold the solid plate 20 in proper position relative to the frame. The points 15 of the flanged side members 12 engage loops 23 on the bottom plate 20, as shown in Fig. 7, so that bottom 20 will be held firmly against movement. Preferably the bottom 20 will be provided with a removable edge 24 secured in any suitable manner, as by riveting or welding, which may be readily replaced if it becomes worn, and the necessity of renewing the entire bottom plate avoided.

The scoop is pivotally mounted on the arms 25 by means of hanger clips 26 and bolts. Arms 25 are supported on pivots 27 on the frame assembly member 28 shown in dotted lines in Fig. 1. The rear end of the arm 25 is adjustably connected by means of a bracket 29 on member 28, which bracket is provided with a series of holes 30 so that the arms 25 can be moved to different positions of adjustment, thereby varying the initial and normal tilt of the scoop to meet different operations.

Figure 9:
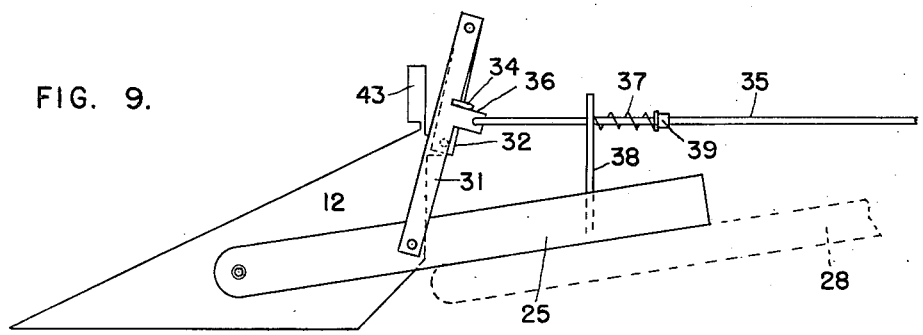
Figure 9 is a side elevation of the scoop, its support and the trip mechanism showing the scoop in its normal position ready for engagement with the material to be lifted.
Figure 10:
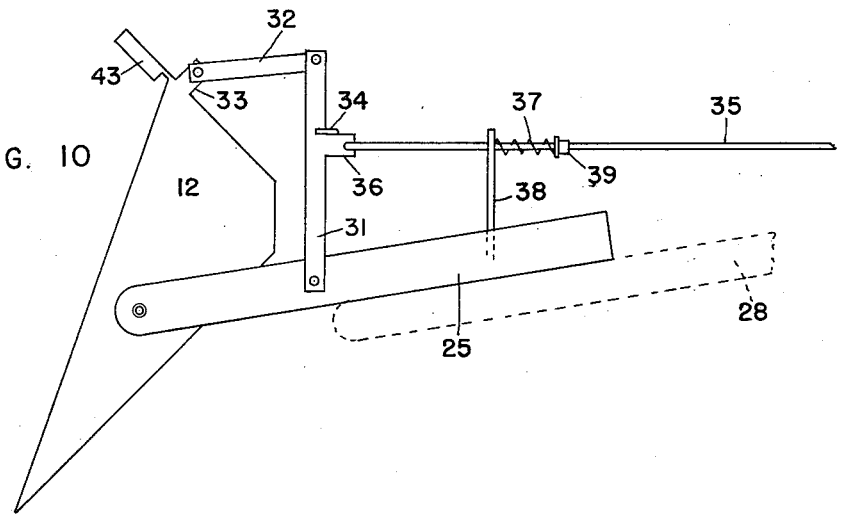
Figure 10 is a view showing the scoop in partially dumping position.

The trip mechanism for the scoop comprises breakable toggle arms 31 and 32, toggle arms 31 being pivotally connected with the supporting arms 25 at their lower ends and being pivotally engaged at its upper end with arm 32 which engages lugs or projections 33 secured to the scoop, This forms a positive coupling between the supporting arms 25 and the lugs or projections 33 on the scoop, which coupling may be moved from its broken to its extended position and impart positive movements to the scoop. Normally, these toggle arms 31 and 32 are aligned and engage the clip 34 as shown in Fig. 9, the clip 34 serving to maintain the toggle arms 31 and 32 in proper relation to each other, the arms in this position being slightly past center so that the scoop will be maintained in initial position. When the scoop has been filled, the trip mechanism for dumping it will be actuated by the trip rod 35 which engages a lug 36 on the toggle arm 31, moving the toggle arms and the scoop to the position shown in Fig. 10, and, on continued operation of the trip rod 35, the scoop will be tilted to the position shown in Fig. 11, with the toggle arms 31 and 32 straightened out as shown.

Figure 1:
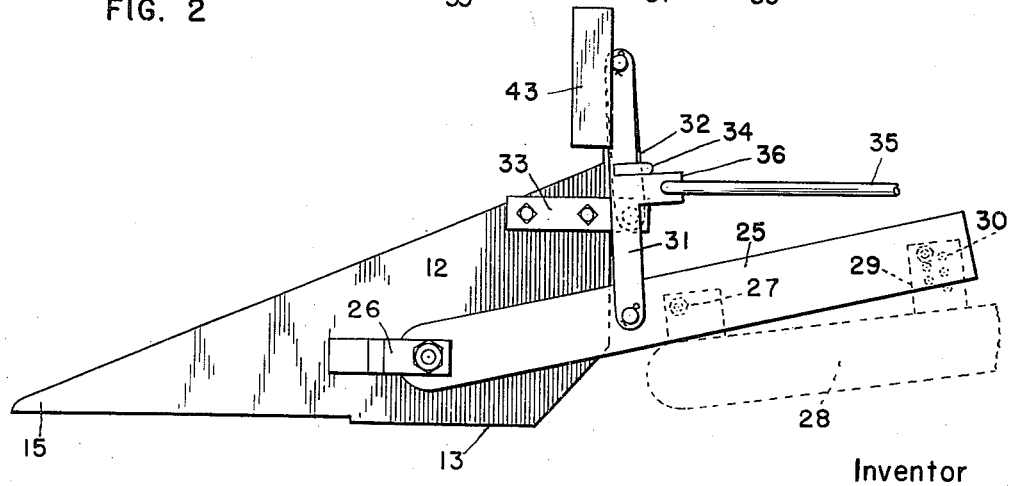
Figure 1 is a view in side elevation of the scoop, supports, and toggle mechanism.
Figure 11:
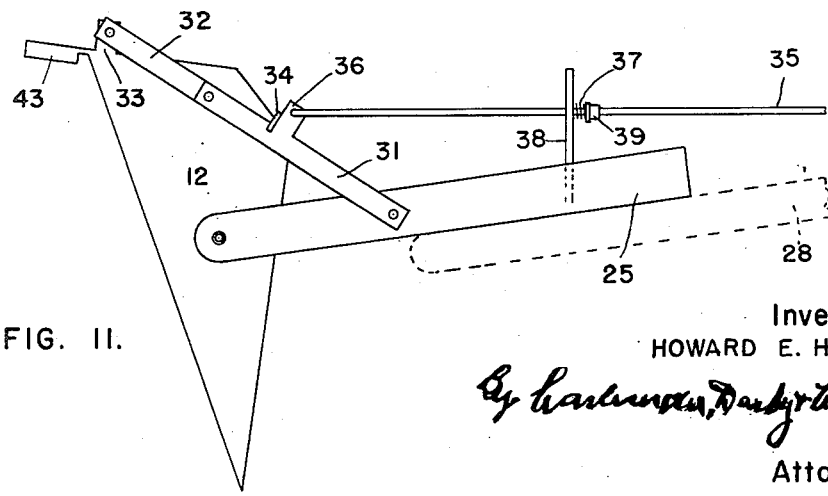
Figure 11 is a view showing the scoop in full dumping position.

The resetting of the scoop can be done by reverse movement of the trip rod 35, a compression spring 37 being disposed between a projection 38 carried by the supporting arm 25 and a stop 39 on the trip rod so that when the scoop is dumped, spring 37 will be compressed as shown in Fig. 11, and when the scoop is reset the spring will assist in returning it to its normal position as shown in Fig. 1. A washer may be interposed between stop 39 and the spring 37. Further, in order to assist in the resetting of the scoop there is preferably provided a torsion spring 41 secured to the rod 42 which connects the arms 32. The spring 41 tends to hold the toggle arms 31 and 32 in their aligned position, and it will assist, of course, in returning the scoop from the dumping position to its normal position. The torsion spring 41 is secured to the rod 42 at one end and at the other end is coupled to the back wall 11 of the scoop. The scoop may be reset, if preferred, and where conditions warrant doing it, by engaging its end with the ground and dragging it backwardly, whereupon the scoop will be returned to its initial position, the compression spring 37 and the torsional spring 41 acting to assist scoop return, exactly as they do when return is made by the trip rod 35.

The scoop 12 is provided with a pocket or housing 43 at each side and at the top of its back wall 11, which housing extends upwardly above the top of the scoop and clear of the load carried thereby. This housing guards the toggle arms 31 and 32 in their collapsed and folded position and protects them from being fouled and operated by contact with the load being handled when the scoop is thrust into the material to pick up its load.

This toggle and trip construction gives a convenient and efficient scoop dumping mechanism, the trip rod 35 being manipulated by the operator in any convenient way, as by a suitably mounted lever (not shown) accessible to the operator. The mechanism is such that it will maintain the scoop in its initial position ready to pick up its load, and it will be maintained in that position until the operator, through the trip rod 35, breaks the off-centered toggle arm and moves the parts to position for dumping the scoop.

While a particular construction has been shown to illustrate the invention, it will be understood that changes within the skill of the mechanic may be made from what is here shown, without departing from the spirit of the invention or the scope of the appended claims which define the invention.

I claim:

1. A scoop and fork assembly comprising a fixed rear wall, fixed side arm sections, and a fixed bottom section combined to form a skeleton frame having an open unobstructed front; a removable bottom section insertable in the open front of said skeleton frame made up of a plurality of tines and a tine supporting cross bar secured to said tines, means on said cross bar for detachably securing it to the fixed side arm sections and means on said tines to engage said fixed bottom section.

2. The invention as defined in claim 1, wherein the side-arm sections of the skeleton frame have inwardly projecting flanges to which the tine-supporting cross-bar of the removable bottom section is secured.

3. The invention as defined in claim 1, wherein the side-arm sections of the skeleton frame have inwardly projecting flanges to which the tine-supporting cross-bar of the removable bottom means is secured, and the bottom section of said skeleton frame has means receiving the rear ends of the tines of the removable bottom.

4. The invention as defined in claim 1, wherein the ends of side-arm sections engage loops on the solid removable bottom section and the removable bottom section has lugs engaging the side-arm and bottom sections of said skeleton frame.

5. A scoop comprising a skeleton frame, a removable forked member mounted in said frame, a tine-supporting cross-bar secured to said forked member and having its ends secured to the side-arms of said skeleton frame, and pins at the rear ends of the tines of said forked member to engage holes in said skeleton frame.

6. The invention as defined in claim 5, wherein the skeleton frame has fixed flanged side-arms and a fixed bottom section provided with apertures, and a removable forked member having a tine-supporting cross-bar engaging the flanges on said side-arms, and pins on the rear ends of said tines to engage the apertures in said fixed bottom.

7. The invention as defined in claim 5, wherein the skeleton frame has flanged side-arms with tapered ends and a fixed bottom section, and a removable bottom section having loops and supporting lugs to engage the tapered ends and flanges of said side-arms, and provided with supporting lugs to engage the fixed bottom section of said frame.

HOWARD E. HALL.

REFERENCES CITED

The following references are of record in the file of this patent:

UNITED STATES PATENTS

| Number | Name | Date |
|---|---|---|
| 460,997 | Skone | Oct. 13, 1891 |
| 890,061 | Jarboe | June 9, 1908 |
| 947,964 | Collins et al. | Feb. 1, 1910 |
| 1,703,275 | Lessmann | Feb. 26, 1929 |
| 1,785,119 | Gorsuch et al. | Dec. 16, 1930 |
| 1,807,632 | McKee | June 2, 1931 |
| 1,989,776 | Weimer | Feb. 5, 1935 |
| 2,063,403 | Schinck | Dec. 8, 1936 |
| 2,190,164 | Seyller | Feb. 13, 1940 |
| 2,242,860 | Huelle | May 20, 1941 |
| 2,332,742 | Mott | Oct. 26, 1943 |
| 2,341,945 | Rabon | Feb. 15, 1944 |
| 2,357,954 | Johnson | Sept. 12, 1944 |
| 2,394,458 | Lull | Feb. 5, 1946 |
| 2,398,119 | Sauder | Apr. 9, 1946 |
| 2,429,717 | Gordon | Oct. 28, 1947 |